Aug. 7, 1956 — A. SOFIA — 2,757,935
COLLAPSIBLE SHOPPING CART
Filed May 13, 1954 — 3 Sheets-Sheet 1

*INVENTOR:*
ANTONIO SOFIA
BY
ATT'YS

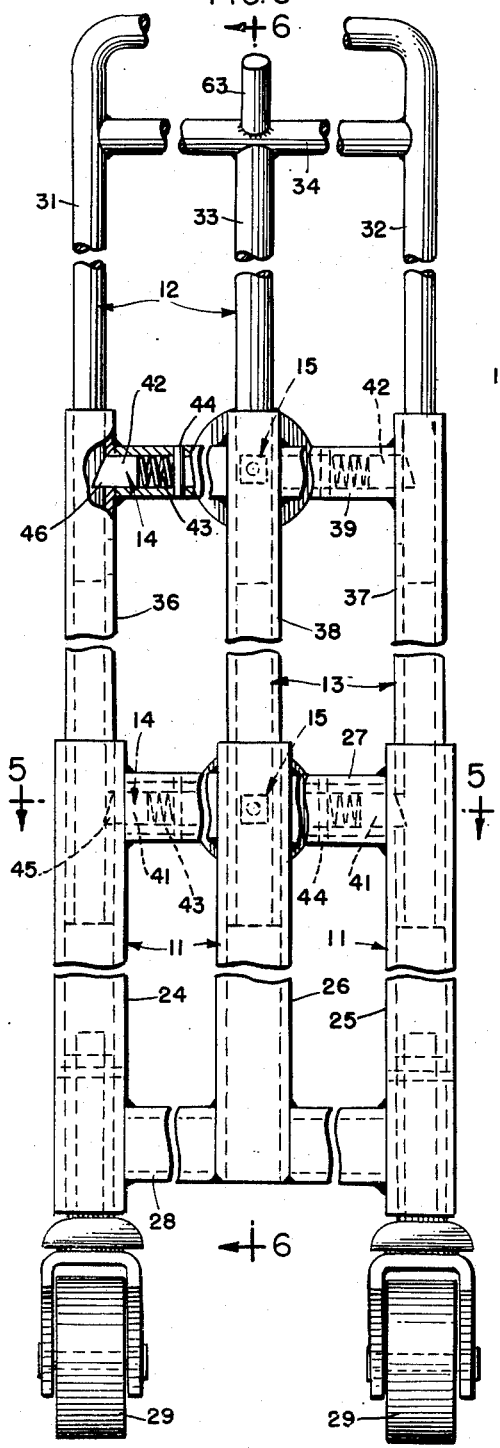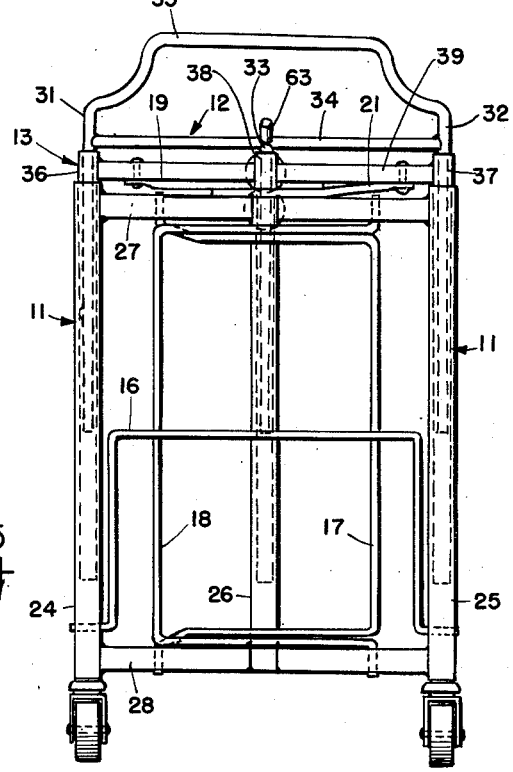

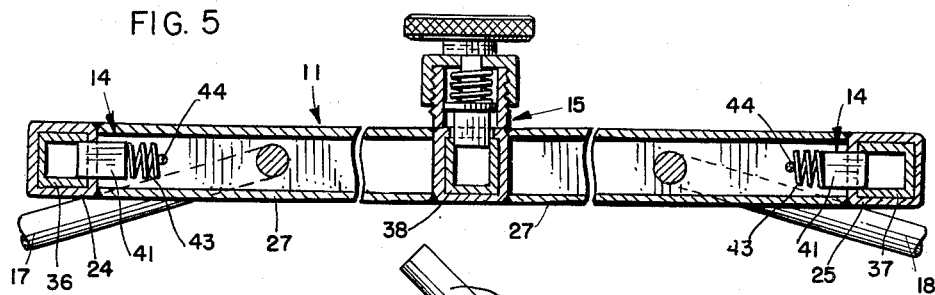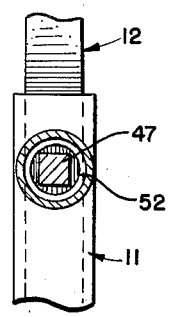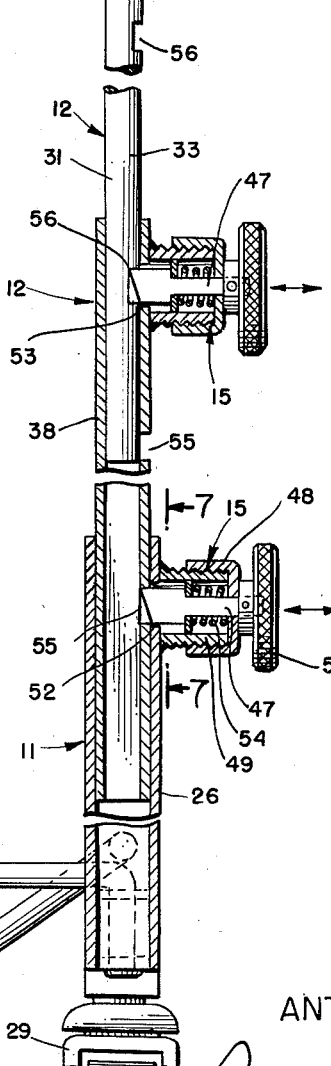

United States Patent Office 2,757,935
Patented Aug. 7, 1956

2,757,935

COLLAPSIBLE SHOPPING CART

Antonio Sofia, Chicago, Ill.

Application May 13, 1954, Serial No. 429,468

3 Claims. (Cl. 280—36)

This invention relates to improvements in shopping carts of the type that are collapsible for carrying or storage and extensible for transport of a bag of parcels, and vice versa.

Heretofore there have been various types of collapsible shopping carts. However, as a rule, their collapse has been of quite a limited nature, so that even in such relationship they are either rather awkward to handle or they require specially-shaped bags or containers for use therewith, and they do not collapse substantially completely.

The main objects of this invention are to provide an improved form of collapsible-extensible shopping cart which, in its collapsed form, is so compact as to permit being carried in a parcel bag or in the hand, and which, in its extended form, will accommodate a large size bag and permit convenient transport thereof loaded to capacity with parcels; to provide an improved form and telescopic arrangement of a plurality of sections for a shopping cart of this kind; to provide improved means for automatically limiting the extension of the sections; to provide improved means for latching the several sections in either their collapsed or extended relationship; to provide an improved arrangement of means for accommodating a parcel bag of maximum dimension and avail its full facilities for parcels; and to provide an improved shopping cart of this kind which is simple in construction, economical to manufacture, and extremely convenient to use.

A specific embodiment of this invention is shown in the accompanying drawings, in which:

Fig. 3 is an enlarged, front elevation of the extended cart, portions of the several sections being broken away and omitted to more clearly indicate the latch means whereby the several sections are limited in their extended relationship.

Fig. 4 is a full front view of the cart collapsed.

Fig. 5 is an enlarged, vertical, cross sectional detail taken on the plane of line 5—5 of Fig. 3.

Fig. 6 is an enlarged, vertical, sectional detail taken on the plane of the line 6—6 of Fig. 3, and Fig. 7 is a cross sectional detail taken on the plane of the line 7—7 of Fig. 6.

Figure 1:
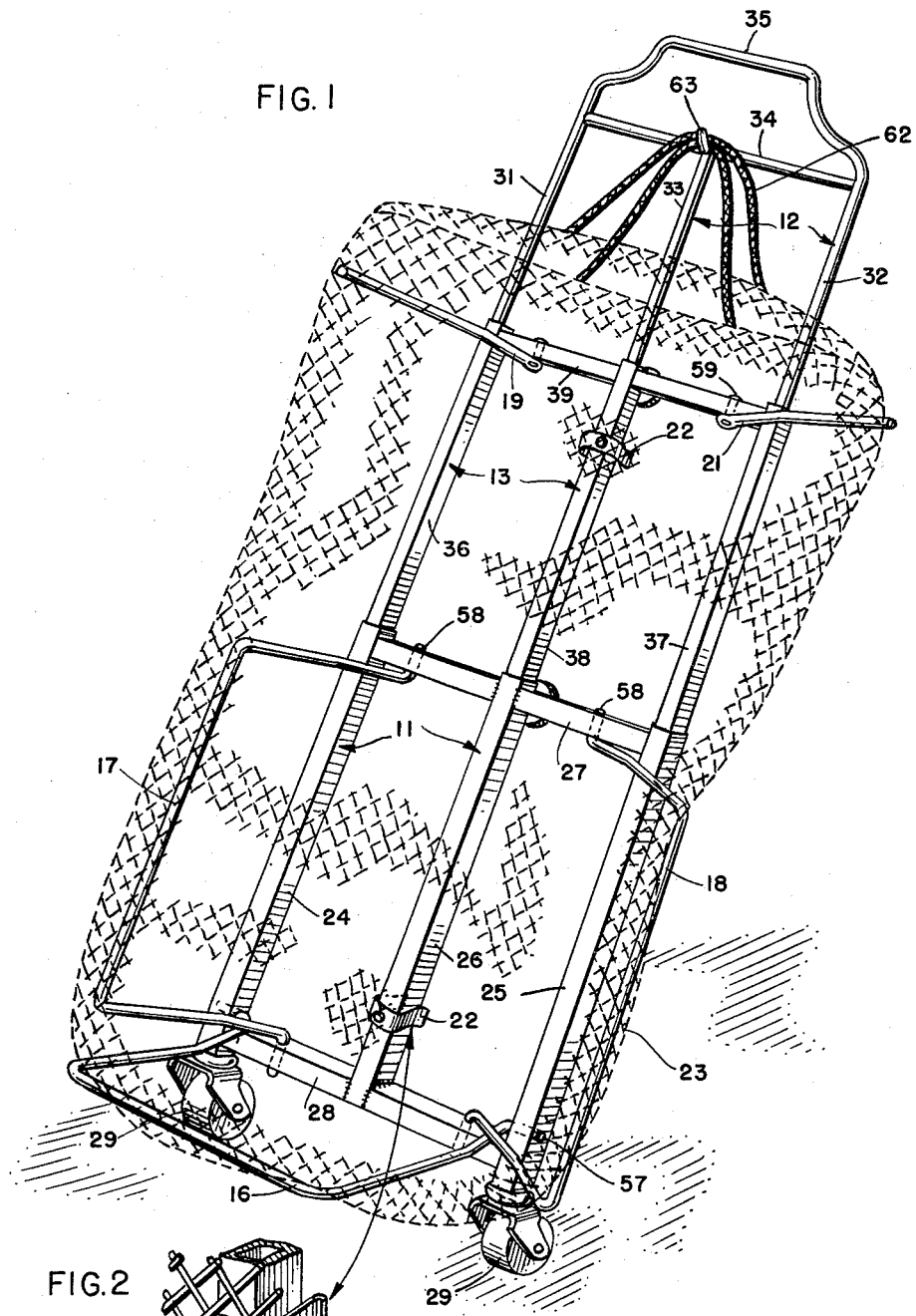
Figure 1 is a perspective view of an extended or open shopping cart constructed in accordance with this invention, a parcel bag of coarse woven character being shown thereon in rather phantom form so as to indicate the full character and relationship of the various parts of the cart.
Figure 2:
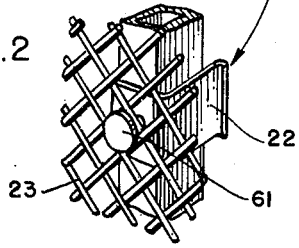
Fig. 2 is an enlarged, fragmentary, perspective detail showing how the bag is held in place by means of removable clips.

The essential concept of this invention involves three telescoping sections, collapsible to almost within the confines of the main base or wheeled section yet extensible to dispose the handle in convenient reach for the shopper, equipped with latching means for securing the sections in either of their relationships and with retractible means for supporting and embracing a parcel bag when the sections are extended.

A shopping cart embodying the foregoing concept comprises three rectangular-shaped, telescoping sections, a base section 11, a handle section 12, and an intermediate section 13, which are secured in their collapsed and extended relationships by latching means 14 and 15, and which mount a series of swingable bails 16, 17, 18, 19, and 21 and detachable clips 22 for supporting and retaining in place, on the extended sections, a bag 23 loaded with parcels.

The base section 11 is constructed with three parallel, square, tubular members 24, 25 and 26 spanned at their opposite ends by top and bottom cross bars 27 and 28. These several parts are suitably bonded together to form a rigid frame constituting the main supporting section for the other parts of the cart. At the lower ends, the side members 24 and 25 are here shown with casters 29. Obviously, these could be wheels of any suitable construction and mounting.

The handle section 12 is here shown formed of round rod material. It could, of course, be formed of tubular material, either round or square. The side members 31 and 32 are spanned by and connected to a cross bar 34. As here shown the side members 31 and 32 extend up beyond the cross bar 34 and are integral with a hand grip 35.

The intermediate section 13, like the base section 11, is constructed with three square, tubular members 36, 37 and 38 spanned and connected together at their upper ends by a tubular cross bar 39. The members 36, 37 and 38 are dimensioned externally and internally to telescopically fit in the members 24, 25, and 26 of the base section 11 and telescopically receive the members 31, 32, and 33 of the handle section 12, respectively.

The latch means 14 and 15 are so arranged and co-ordinated that, subject to the manual manipulation of the latter, the sections 11, 12, and 13 are limited in their normal pull out to extended relationship, but free to be readily collapsed, and may be secured in either position against accidental alteration.

The latch means 14 comprises two sets of detents 41 and 42 (see Fig. 3) of square cross section, slidably supported in the opposite ends of the respective cross bars 27 and 39 of the base section 11 and the intermediate section 13. These detents 41 and 42 have tapered outer ends and are pressed by springs 43, bearing against the pins 44, to seat such detent ends in the notches 45 and 46, respectively formed in the opposed faces of the side members 36 and 37, of the base section 11 and the side members 31 and 32 of the handle section 12, to limit the outward extension of the sections 13 and 12 with respect to the base section 11 and intermediate section 13 respectively.

The latch means 15 (most clearly shown in Figs. 5, 6 and 7) comprises two identical constructions. Hence, only one requires detail description here.

The pawl 47 is slidably supported on a hub 49 and a cap 48 threaded on the hub, secured to the cross bar 27 (with one also on the cross bar 39) at the point of juncture with the middle member 26. The pawl 47 mounts a knob 51 on its outer end and extends through an aperture 52 in the middle tubular member 26 of the base section 11 (or through an aperture 53 in the middle member 38 of the intermediate section 13). A spring 54 exerts the pawl 47 to press its tapered end against the middle member 38 of the intermediate section 13 and into one or the other of the apertures 55 therein (or against the middle member 33 of the handle section 12 and into one or the other of the notches 56).

The apertures 52 and 53 are annular in form whereas the notches 55 and 56 are square to accommodate the square (in cross section) tapered end of pawls 47. Thus each pawl 47 may be turned to present the tapered end thereof in either direction longitudinally of the middle members of the sections 13 and 12, thereby making possible the positioning of the pawls 47 so as to engage the notches 55 and 56 and secure the sections 12 and 13 in either their extended or collapsed relationship with respect to each other and to the base section 11.

The bag-retaining bails 16, 17 18, 19, and 21 are all here shown formed of heavy guage wire. The bails 16, 17, and 18 are in the nature of loops, whereas the bails 19 and 21 are in the nature of arms. The looped wire bail 16 has trunnion ends 57 respectively seated in holes in the lower ends of the side members 24 and 25 of the base section 11, near the cross bar 28, so that the bail 16 may be swung from a folded position against the section 11 to an outwardly disposed position (see Figs. 1 and 6) to support the bottom of the bag 23. The looped wire bails 17 and 18 have trunnion ends 58 respectively seated in holes in the cross bars 27 and 28, near the outer ends thereof, so that these bails may be swung from overlapping folded positions against the base section 11 to outwardly disposed positions to embrace the lower sides of the bag 23.

The arm-like wire bails 19 and 21 are swingably secured to pins 59, seated in the intermediate cross bar 39 near the ends thereof, so as to swing from overlapping folded positions against the intermediate section 13 to outwardly disposed positions to embrace the top part of the bag 23.

The clips 22, two of which are here shown, are U-shaped spring steel adapted to snap on over the tubular middle members, 26 and 38 respectively, of the base and intermediate sections 11 and 13. The clips 22 may be permanently secured to the bag 23 or the latter may be merely pressed over the heads 61 of the clips 22.

The bag 23 is here shown of coarse woven structure with the usual handle loops 62, which loops 62, when the bag 23 is in place for use on the extended sections, are caught over a hook 63, on the cross bar 34 of the handle section 12.

The shopping cart herein shown is operated and used in the following manner:

To collapse the cart, for storage or carrying, subject to later use, the handle section 12 is pressed down into the intermediate section 13 as the latter is pressed down into the base section 11. This is permitted if the pawls 47 are turned so that the tapered inner ends thereof face upwardly, the opposite to what is shown in Fig. 6. Thus when downward pressure is applied to the hand grip 35, the sections 12 and 13 may be collapsed as above noted, because the upper edges of the notches 55 and 56 ride down over the tapered ends of the pawls 47, and retract then, at the same time that the tapered faces of the notches 45 and 46 are coacting with the tapered ends of the detents 41 and 42 to retract them. When the sections are completely collapsed, the pawls 47 automatically enter the upper notches 52 and 56 and secure the sections in their collapsed relationship.

Thus collapsed, the bails 16, 17, 18, 19, and 21 are folded over onto the base section 11 and one has a shopping cart more compact than anything heretofore known. So compact is it that it may be put in the bag 23 for carrying until one reaches the store where the shopping for parcels is to take place.

To extend the collapsed cart, to make ready for the transport of a bag of parcels, the knobs 51 are both again gripped, retracted, turned, and released. This disposes the tapered ends of the pawls 47 downwardly, (the positions shown in Fig. 6). The sections 12 and 13 may then be pulled outwardly of the sections 13 and 11 respectively, to the extent permitted by the seating of the detents 41 and 42 in the notches 45 and 46 adjacent the inner ends of the members 36 and 37 and 31 and 32 respectively. When these sections 12 and 13 have been thus extended, the pawls 47 automatically enter the lower notches 55 and 56 so that the sections are locked in the extended positions against accidental collapse.

With the sections thus extended, the bails 16, 17, 18, 19 and 21 are swung to their outwardly-disposed positions and the bag 23, with the loops 62 hung over the hook 63, is laid against the extended sections and embraced within the confines of the several bails. The clips 22 are snapped over the members 26 and 38, whereupon the cart is ready to have the bag 23 loaded to its full capacity if desired.

Although but one specific embodiment of this invention is herein shown and described, it will be understood that numerous details of the construction shown may be altered or omitted without departing from the spirit of the invention as defined by the following claims.

I claim:

1. A collapsible shopping cart comprising, three rectangular-shaped sections each including a pair of parallel members connected by a top cross bar and telescopically arranged successively one within another for longitudinal adjustment between collapsed and extended relationships, wheels on one of the sections, automatically-acting latch means for positively limiting the extension of the sections but permitting their collapse, other manually adjustable automatically-acting latch means on the cross bars of two of the sections engageable with the respective telescoping section members for alternately securing the sections against unintentional relative shifting in either relationship, and means for supporting a parcel bag on the extended sections.

2. A collapsible shopping cart comprising, a base wheeled section, a handle section, and an intermediate section each including three parallel members connected by top cross bars and arranged with the handle section members telescoping within the intermediate section members and the intermediate section members telescoping within the base section members so as to permit longitudinal adjustment of the sections between collapsed and extended relationships, manually adjustable automatically-acting latch means on the cross bars of the base and intermediate sections engageable with the middle members of the respective telescoping section for alternately securing the sections against unintentional relative shifting in either relationship, and coacting means on certain of the sections for removably supporting a parcel bag on the extended sections.

3. A collapsible shopping cart comprising, a base wheeled section, a handle section, and an intermediate section each including three parallel members connected by top cross bars and arranged with the handle section members telescoping with the intermediate section members and the intermediate section members telescoping with the base section members so as to permit longitudinal adjustment of the sections between collapsed and extended relationships, spring pressed taper-faced detents positioned at the end of the cross bars of the base and intermediate sections to engage notches in the respective side members of the intermediate and handle sections to limit the extension of the sections, spring pressed pawls positioned on the base and the intermediate section cross bars to engage notches in the respective middle members of the intermediate and handle sections, knobs on the pawls for adjusting the pawls to effect their engagement with the section members to secure the sections in either relationship, and coacting means on the sections for supporting a parcel bag on the extended sections.

References Cited in the file of this patent

UNITED STATES PATENTS

| 341,557 | Cory | May 11, 1886 |
| 904,542 | Ledig | Nov. 24, 1908 |
| 1,112,963 | Alexander | Oct. 6, 1914 |
| 2,514,849 | Dewing | July 11, 1950 |
| 2,602,675 | Forman | July 8, 1952 |